US010038318B2

(12) United States Patent
Price et al.

(10) Patent No.: US 10,038,318 B2
(45) Date of Patent: Jul. 31, 2018

(54) POWER SUPPLY

(75) Inventors: Les Price, Bedfordshire (GB); Stephen Fowlston, Buzzard (GB); David Gareth Williams, Hertfordshire (GB)

(73) Assignee: Cooper Technologies Company, Houston, TX (US)

( * ) Notice: Subject to any disclaimer, the term of this patent is extended or adjusted under 35 U.S.C. 154(b) by 1154 days.

(21) Appl. No.: 14/128,297

(22) PCT Filed: Jun. 20, 2012

(86) PCT No.: PCT/GB2012/051427
§ 371 (c)(1),
(2), (4) Date: Jun. 27, 2014

(87) PCT Pub. No.: WO2013/001280
PCT Pub. Date: Jan. 3, 2013

(65) Prior Publication Data
US 2014/0300192 A1    Oct. 9, 2014

(30) Foreign Application Priority Data
Jun. 27, 2011    (GB) .................................. 1110823.0

(51) Int. Cl.
*H02J 1/14*    (2006.01)
*G06F 1/26*    (2006.01)
(Continued)

(52) U.S. Cl.
CPC ................. *H02J 1/14* (2013.01); *G06F 1/26* (2013.01); *G06F 11/2015* (2013.01); *H02J 4/00* (2013.01);
(Continued)

(58) Field of Classification Search
CPC . G06F 1/26; G06F 11/2015; H02J 1/14; H02J 4/00; H02J 9/04; H02J 1/102; H02J 2001/106; H02J 3/46; Y10T 307/555
(Continued)

(56) References Cited

U.S. PATENT DOCUMENTS 4,924,170 A    5/1990    Henze
5,834,925 A *  11/1998    Chesavage .............. H02J 1/108
                                                    307/58
(Continued)

FOREIGN PATENT DOCUMENTS

EP    1819028 A2    8/2007

OTHER PUBLICATIONS

Mark Semple, PCT/GB2012/051427 International Search Report, dated Feb. 6, 2013, 3 pages, European Patent Office.

*Primary Examiner* — Thienvu Tran
*Assistant Examiner* — Brian K Baxter
(74) *Attorney, Agent, or Firm* — King & Spalding LLP

(57) ABSTRACT

The invention can provide for a power supply, and in particular a fieldbus power supply, comprising a plurality of power supply modules each arranged to output power on a plurality of channels; a current share controller arranged to share an output current requirement across the plurality of power supply modules and wherein; at least a second of the plurality of channels in each module is arranged to track the loading of the first of the plurality of channels in each respective module and so that a multichannel and multimodule power supply with reduced power handling requirements for each module can be provided.

11 Claims, 4 Drawing Sheets

(51) Int. Cl.
*G06F 11/20* (2006.01)
*H02J 4/00* (2006.01)
*H02J 9/04* (2006.01)
*H02J 1/10* (2006.01)
*H02J 3/46* (2006.01)

(52) U.S. Cl.
CPC ................ *H02J 9/04* (2013.01); *H02J 1/102* (2013.01); *H02J 3/46* (2013.01); *H02J 2001/106* (2013.01); *Y10T 307/555* (2015.04)

(58) Field of Classification Search
USPC .......................................................... 307/53
See application file for complete search history.

(56) References Cited

U.S. PATENT DOCUMENTS

| | | | | |
|---|---|---|---|---|
| 5,945,816 A * | 8/1999 | Marusik | ................... | G05F 1/56 307/86 |
| 6,014,322 A * | 1/2000 | Higashi | ................... | H02J 1/102 363/65 |
| 6,215,290 B1 | 4/2001 | Yang et al. | | |
| 6,301,133 B1 * | 10/2001 | Cuadra | ................... | H02J 1/102 363/65 |
| RE38,454 E * | 3/2004 | Walters | ................... | G06F 1/28 323/272 |
| 6,788,036 B1 * | 9/2004 | Milavec | ................... | H02J 1/102 323/237 |
| 6,815,843 B1 * | 11/2004 | Kageyama | ............. | H02J 1/102 307/42 |
| 6,894,466 B2 * | 5/2005 | Huang | ................... | H02M 3/1584 323/272 |
| 7,282,899 B1 * | 10/2007 | Daun-Lindberg | ........ | H02J 1/10 323/272 |
| 8,847,438 B2 * | 9/2014 | Steele | ................... | H02J 1/102 307/112 |
| 2002/0108065 A1 * | 8/2002 | Mares | ................. | G05D 1/0077 713/300 |
| 2003/0111909 A1 * | 6/2003 | Liu | ........................ | H02J 1/102 307/64 |
| 2003/0112647 A1 * | 6/2003 | Liu | ........................ | H02J 1/102 363/144 |
| 2005/0073783 A1 * | 4/2005 | Luo | ....................... | H02M 7/493 361/62 |
| 2005/0286278 A1 * | 12/2005 | Perreault | ............... | H02M 3/285 363/65 |
| 2006/0209580 A1 * | 9/2006 | Itakura | ................... | H02J 1/102 363/65 |
| 2007/0094524 A1 * | 4/2007 | Kris | ....................... | H02J 1/102 713/300 |
| 2008/0203985 A1 * | 8/2008 | Dong | ................... | H02M 3/157 323/272 |
| 2008/0320322 A1 * | 12/2008 | Green | ....................... | G06F 1/26 713/340 |
| 2009/0009005 A1 * | 1/2009 | Luo | ....................... | H02M 7/493 307/82 |
| 2010/0277140 A1 * | 11/2010 | Liu | ........................ | H02J 1/10 323/234 |
| 2011/0131455 A1 * | 6/2011 | Law | ....................... | H04B 3/548 714/40 |
| 2011/0140683 A1 * | 6/2011 | Zilberberg | ................ | H02J 9/06 323/311 |
| 2011/0225452 A1 * | 9/2011 | Duan | ....................... | G06F 1/26 714/14 |
| 2012/0068544 A1 * | 3/2012 | Bushue | ................... | H02J 1/102 307/80 |
| 2014/0086723 A1 * | 3/2014 | Bengtson | ................ | F03D 7/047 415/1 |

* cited by examiner

POWER SUPPLY

RELATED APPLICATIONS

This application is a Section 371 national phase application of and claims priority to PCT application PCT/GB2012/051427 filed on Jun. 20, 2012, which claims priority to Patent Application Number 1110823.0 filed with the Patent Office of The United Kingdom on Jun. 27, 2011, the contents of which are incorporated herein in their entirety.

TECHNICAL FIELD

The present invention relates to a power supply and, in particular, but not exclusively, to a fieldbus power supply.

BACKGROUND

Power supplies are often required to deliver power to remote devices/systems at remote locations and such a need arises in particular in relation to fieldbus power supplies.

Such supplies are employed to deliver power, and sometimes additionally data etc., to remote-located field devices from a central control/power supply location. The remote devices can take the form of any required equipment such as sensors, actuators, control switches etc. which can be found at different locations within, for example a processing plant. All such devices require power, and often a communication, connectivity to the central control location and it is not uncommon for such field devices to be found in hazardous, for example potentially explosive, environments where the avoidance or quenching of sparks/arcs can prove important.

Fieldbus power supplies are currently widely known and generally comprise one or more power supply modules offering one or more channels for the delivery of power to a corresponding number of fieldbus channels. Within each module, the plurality of channels are often isolated and have there own dedicated Power Supply Unit (PSU) and conditioner circuitry in order to feed each respective fieldbus channel as required.

It is also widely recognized that some degree of fault tolerance is desirable so as to ensure continued operation of the remotely-located field devices should one, or perhaps more, of the power supply modules fail. For this purpose, it is known to build a level of redundancy into field bus power supplies.

In one known arrangement, each of the modules is mirrored by a redundant module, thereby forming a redundant pair. In normal operation of such arrangement, one of the modules in the pair supplies power to the required fieldbus channel. Should the module supplying the power fail, the previously redundant module in the pair can then be switched-in for operation in order to meet the channel's power supply requirements whilst the failed module is investigated for repair or replacement as appropriate.

In an alternative system, the two modules can be arranged to share the power requirement generally on a 50/50 basis for normal operation; but wherein each has the capability to take on 100% of the requirement should the other fail.

The use of back-up power supply systems is in any case widely known for seeking to maintain a variety of possible power requirements, whether or not within the fieldbus environment, and one such example is disclosed in US-A-2007/0162771. While the level of redundancy discussed above can be considered as that involving 2N devices (where N is the number of devices needed to fulfill the power supply requirements during normal operation); the level of redundancy within this document includes an N+1 architecture, again where N is the number of devices that can jointly meet the total power requirements during normal operation.

Known power supplies such as the field bus power supplies as discussed above can prove disadvantageous and limiting with regard to their general construction and nature of redundancy in view of the high level of duplication of circuitry, and circuitry elements, required and also due to the relatively high loading requirements that can lead to operational characteristics, such as heating, requiring potentially expensive and/or inefficient and/or space-consuming compensating features such as heat sync requirements etc.

A desire for greater efficiency and/or cost effectiveness and/or compact design considerations is therefore identified by the present invention.

SUMMARY

The present invention seeks to provide for a power supply such as a fieldbus power supply having advantages over known such supplies.

According to one aspect of the present invention there is provided a power supply comprising a plurality of power supply modules each arranged to provide power on a plurality of channels;

a current share controller arranged to share an output current requirement across the plurality of power supply modules; and at least a second of the plurality of channels in each module being arranged to track the output voltage of a first of the plurality of channels in each respective module under all loading conditions.

The load sharing that arises between the modules proves advantageous in reducing power-handling characteristics, such as heat-sinking, in each of the modules. In particular, in an arrangement of the present invention at no time is any one individual module required to take on the full load. The maximum power dissipation for each model is therefore lower than might otherwise be the case which serves to increase reliability and reduce power handling characteristics such as, but not limited to, heat sinking.

Further, such advantages can be readily replicated within the multichannel environment by way of the channel tracking/following.

Such a power supply can include redundant power supply functionality, and, in particular an N+1 redundancy architecture.

Advantageously, the current share can be controlled across the first channels of the respective power supply modules.

In one particular configuration, the said first channel can serve as a regulated channel.

In this manner each of the second, and any subsequent channels can be considered as non-regulated channels.

Advantageously the current share controller is arranged for balanced load sharing between the plurality of power supply modules.

Control feedback functionality can be included for the current sharing and, further, each module can comprise a current share controller and control feedback arrangement.

As a further feature, each module can employ an internal adjust on a regulated channel and by way of a single external share line.

A particularly compact configuration can be achieved wherein each module employs a single power supply unit.

The configuration can include a single transformer, common to the first, second and any subsequent channels within each module.

As appropriate, each module can comprise a switch mode power supply controller and single transformer.

It should be appreciated that the invention is particularly relevant to adoption with any form of multi-output power supply system which can also benefit from redundancy and channel-tracking.

In one particular embodiment, the present invention comprises a field bus power supply. According to another aspect of the present invention there is provided a power supply comprising a plurality of power supply modules each arranged to output power on a plurality of channels, and comprising a current share controller arranged to share an output current requirement across the plurality of power supply modules.

According to this aspect, at least a second of the plurality of channels in each module is arranged to track loading of a first of the plurality of channels in each respective module.

Again, this aspect can advantageously comprise a fieldbus power supply.

BRIEF DESCRIPTION OF THE DRAWINGS

The invention is described further hereinafter, by way of example only, with reference to the accompanying drawings in which.

DETAILED DESCRIPTION OF THE EXAMPLE EMBODIMENTS

Figure 1:
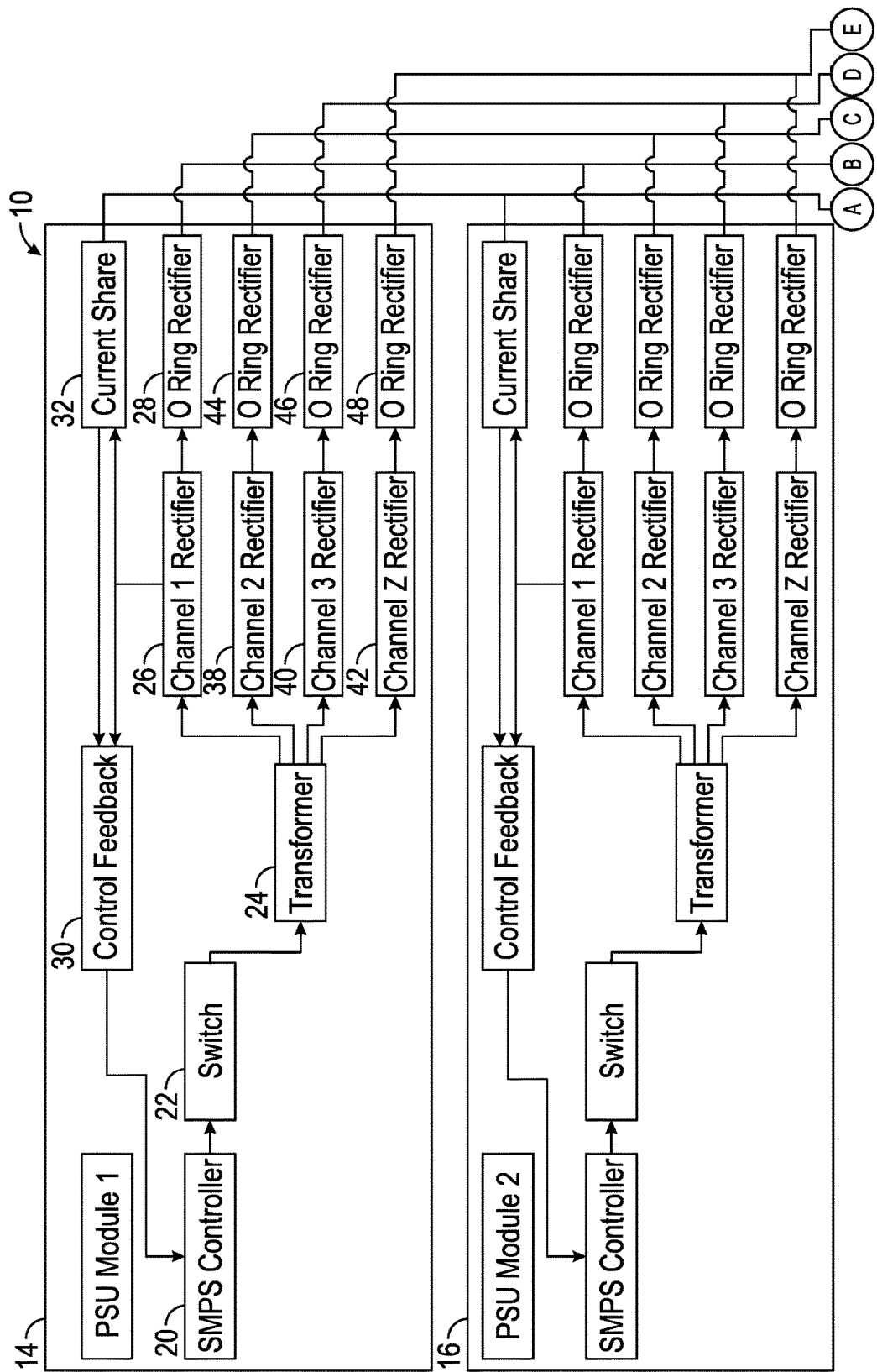
FIG. 1 is a schematic representation of a multichannel fieldbus power supply according to one embodiment of the present invention.
Figure 1:
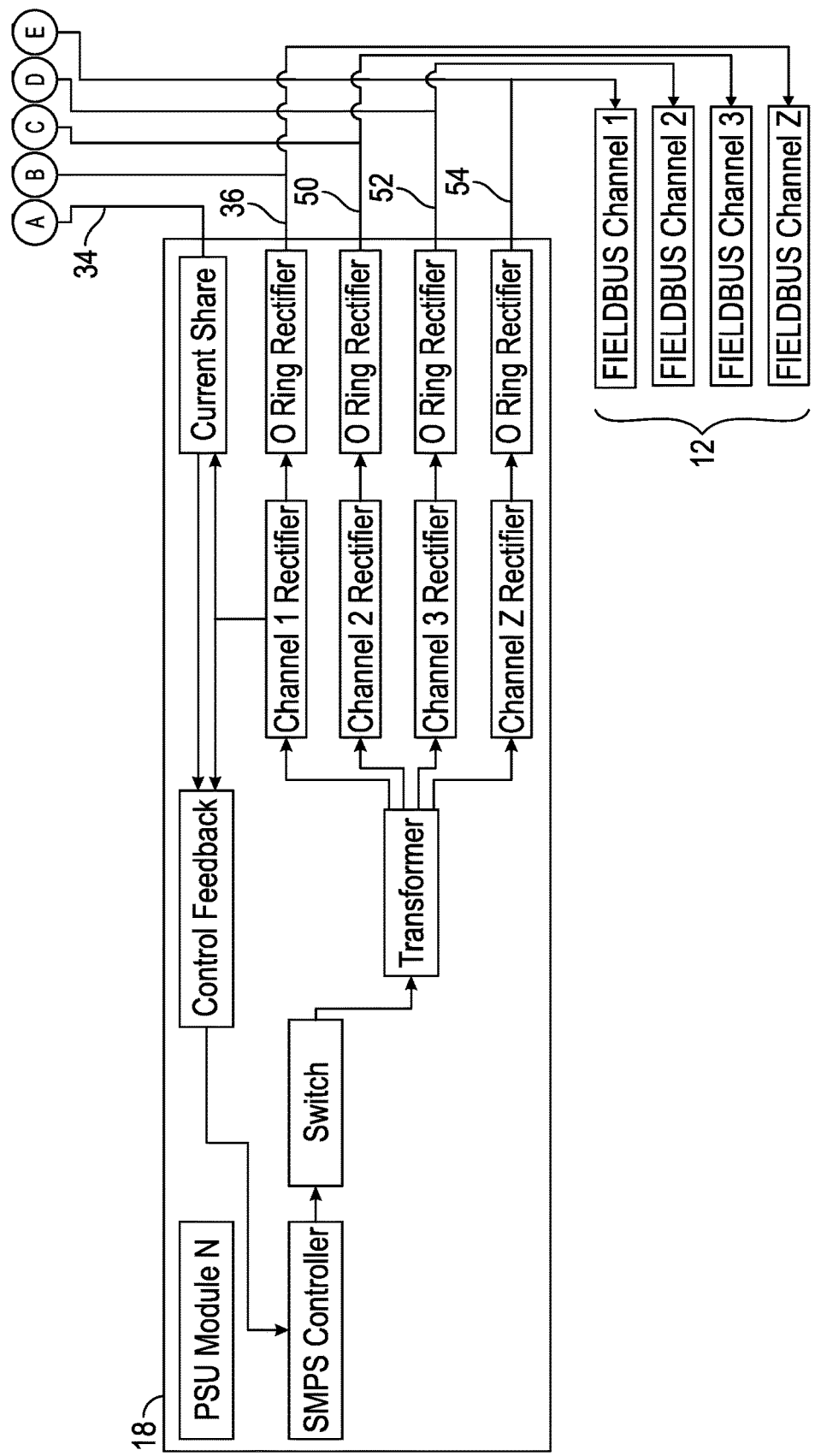

Turning first to FIG. 1 there is illustrated in block schematic form a multichannel fieldbus power supply 10 generally arranged to supply power over Z channels by way of N power supply modules. For ease of reference, in the illustrated example, Z=4 and N=3.

Although not specifically illustrated, an N+1 level of redundancy is also incorporated into the power supply 10 such that a further (redundant) power supply module could also be included, to share the power supply load of the supply 10 should one of the three power supply modules fail.

Assuming normal operation without any failure, four field bus channels 12 are arranged to be supplied by three power supply modules 14, 16, 18 of the power supply 10.

In this illustrated embodiment, each of the power supply modules 14, 16, 18 is a mirror of the other and so the full functional construction details of each are discussed and illustrated only in relation to the power supply module 14.

As noted, each of the power supply modules comprises a multichannel module supplying power to the four channels 12.

As will be discussed in further detail below, a first of the four channels with in each module (14, 16, 18) comprises a main (regulated) channel, whereas the remaining three channels comprise additional (unregulated) channels advantageously arranged to follow the behaviour of the regulated channel.

Each of the four channels of the supply modules (14, 16, 18) combines with each of the respective four channels of the other modules so as to share the power supply requirements for each channel an output at 12.

Referring in particular to power supply module 14 with its PSU there is provided a Switch Mode Power Supply (SMPS) controller 20 and associated switch 22 which serve to define a regulated channel feeding through transformer 24, rectifier 26 and O ring diode 28 to provide a supply current on a regulated one of the four fieldbus channels 12.

An important consideration of the present invention is that the requirements of each of the four channels at 12 are to be satisfied by the plurality (three in the illustrated example) of power supply modules such that the current and loading requirements of the fieldbus channel are shared across those three modules.

Such sharing is achieved advantageously in a balanced manner by way of a current share 32, an associated control feedback 30, circuitry which serves to achieve dynamic adjustment of the load balancing such that no one module (14, 16, 18) attempts to drive the load via the first 36 of the four channels 12 unilaterally.

As is discussed further below, this advantageously increases the efficiency and reliability of the present invention.

That is, the current share and control feedback functionality 30, 32 within the module 14 is mirrored in each of the modules 16, 18 so as to achieve the aforementioned dynamic load balancing across all three modules 14, 16, 18.

Active current share control is therefore applied across the regulated channels in each of the modules and, as discussed further below, similar current sharing functionality is therefore achieved responsive to this across all of the respective related unregulated channels of the three modules 14, 16, 18—and leading to channels 50, 52, 54—in a particularly efficient manner.

As will be appreciated from the schematic representation of each module, but with particular reference to module 14, each of the rectifier pairs 38, 44; 40, 46 and 42, 48 forming the three unregulated channels of module 14 are fed from the same transformer 24 as forming part of the regulated channel. The rectifier pairs can comprise diode pairs or any other appropriate rectifier arrangement such as those employing MOSFETs.

Each of the unregulated channels therefore tracks/follows the regulated channel in a manner that can be accurately defined and controlled by way of the appropriate configuration of transformer windings.

Thus, insofar as the main (regulated) channels of each of the modules share the current/loading requirement of their related field bus channel 36, so do each of the respective second-fourth (unregulated) channels of each of the second-fourth fieldbus channels 50, 52, 54.

The four fieldbus channels 12 can therefore be supplied with the required current in a particularly efficient manner.

As compared with known supply arrangements, there is therefore no need for duplication of the PSU and conditioner circuitry for each of the channels and, through the current sharing technique, the power handling requirements for each of the modules can advantageously be reduced so as to reduce design constraints, improve cost effectiveness and meet functional characteristics, such as heat-sinking, in a particularly efficient and cost effective manner.

As should therefore be appreciated from the illustrated embodiment, the topology envisaged by present invention employs N+1 modules where N is the number of modules needed to meet the output requirements of each channel. Each module has one complete PSU which and, when connected to a current sharing circuit, allows the N+1 modules to share the required output current. The control feedback within each PSU in conjunction with the current sharing circuit ensures that load sharing between the modules remains balanced.

Since there is only one SMPS controller, and one transformer, in each module, each additional channel shares the single transformer used by the main (regulated) channel. As a particular advantage, the construction of the transformer allows the additional (unregulated) channels within each module to track/follow the relative loading of the main (regulated) channel. Such construction of the transformer requires that each additional secondary channel is closely coupled to the main (regulated) secondary channel so as to achieve the required tracking. Advantageously, the present invention can therefore require only one SMPS controller, and one controller feedback loop, per module so that it is possible to attain each additional channel within the module for a mere fraction of the design considerations, and indeed cost, of a single channel.

In the illustrated example of the present invention, and to achieve the required output voltage tracking, the input stage of the power supply comprises a single switch mode circuit feeding the isolated primary winding of the transformer. As noted, the transformer also has two or more secondary windings isolated from one another but wound in a multifilar way to maximize coupling and thus the required voltage tracking. Each secondary winding feeds a rectifier circuit to provide a DC voltage output. One of the outputs is voltage-regulated by feeding-back a galvanically isolated control signal to the switch mode circuit. The other outputs will then tend to track this regulated output.

The current sharing circuitry dynamically adjusts the load balancing such that no one module attempts to drive the load unilaterally which increases the efficiency and reliability of the present invention.

Thus, and as the illustrated embodiment of the present invention indicates, current sharing can be achieved by way of a single current share control and monitoring line connecting the regulated channels of N sharing power supplies. This control and monitoring line is driven by way of a current monitoring circuit in each of the N power supplies to provide a voltage feedback representative of the combined output currents. The current share line is monitored so that each power supply is able automatically to adjust its output voltage to achieve near equal current sharing with the other power supplies to meet the demand of the load.

Further, insofar as the current supply requirements of each fieldbus channel 12 are met in a shared fashion across each of the three modules, the individual power-handling requirements of each module is therefore reduced. This has a particularly advantageous effect on the operational characteristics of each module and, in particular, the steps that have to be taken to meet heat sinking requirements. Such requirements are much less than would be the case if the power on each channel was supplied by a single module.

The use of tracking and current share schemes such as those as discussed above advantageously provide for any required number of unregulated channels, which can be connected together in an N+1 formation to achieve the required current sharing.

Figure 2:
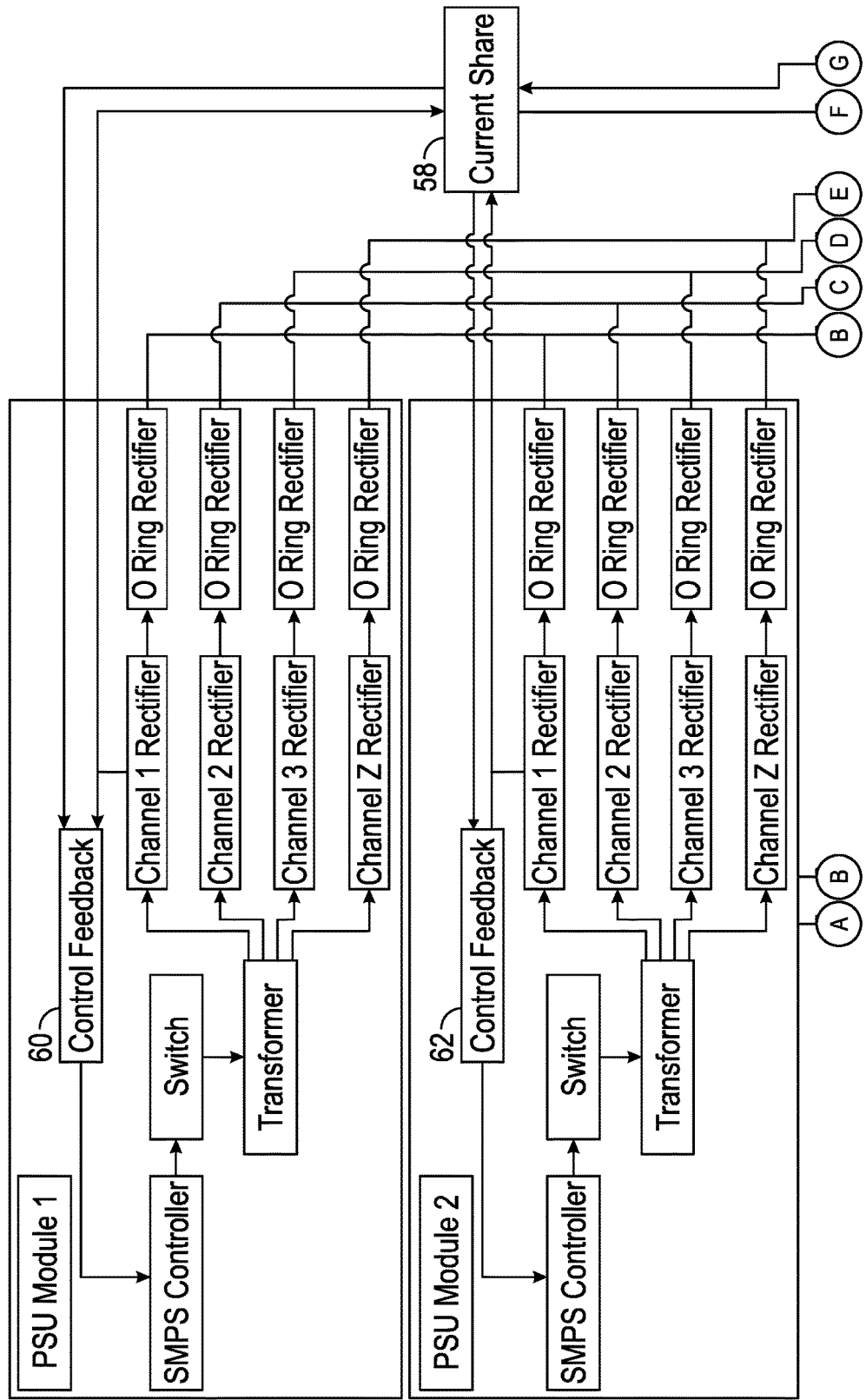
FIG. 2 is a schematic block diagram of a multichannel fieldbus power supply according to another embodiment of the present invention.
Figure 2:
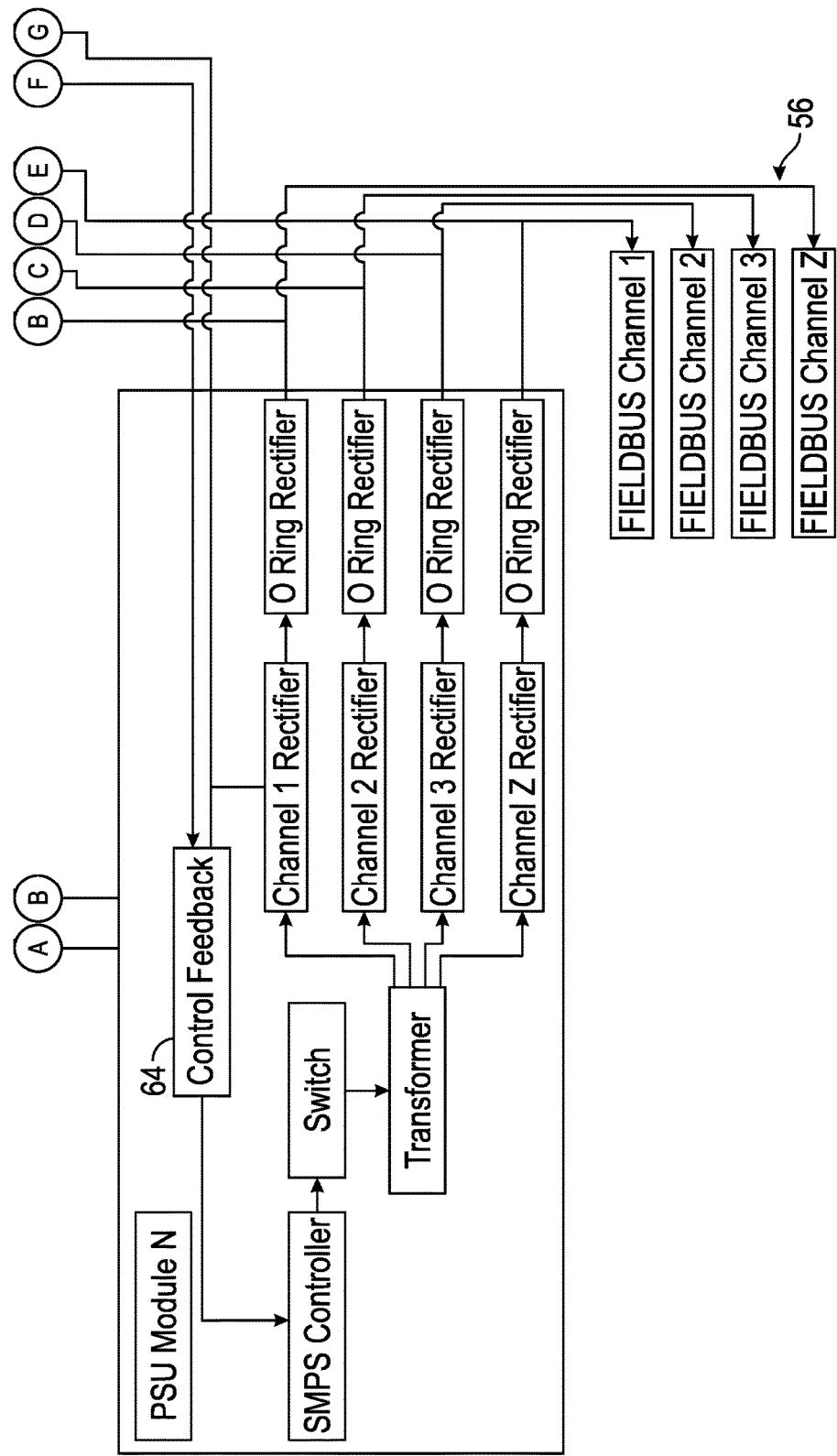

Turning now to FIG. 2 there is illustrated a second embodiment 56 of the present invention which shares a degree of similarity with the first embodiment.

The second embodiment 56 of the power supply is again illustrated with three separate modules supplying four fieldbus channels although in this embodiment, a single current share stage 58 is provided straddling the three modules and interfacing respectively with each of the respective control feedback circuits 60, 62, 64 of the three modules as illustrated.

The operational functionality however of the power supply 56 illustrated in FIG. 2, particularly as regards the power-sharing and channel-current following aspects of the main (regulated) channel, remain consistent with that discussed above in relation to the embodiment of FIG. 1.

It should be appreciated that the respective embodiments of the present invention can be provided with a DC or AC supply as required and without any effect on the design considerations of the other features of the invention. In particular, an embodiment handling an AC supply could be arranged in the alternative to quite readily handle a DC supply.

Thus, the invention can provide for a power supply, and in particular a fieldbus power supply, arranged to output power on a plurality of channels wherein at least a second of the plurality of channels in each module is arranged to track the loading of the first of the plurality of channels in each respective module of a plurality of power supply modules and so that a multichannel and multimodule power supply with reduced power handling requirements for each module can be provided.

Indeed, it should be appreciated that the invention is not restricted to the details of the forgoing embodiment.

For example, any appropriate power supply arrangements can be provided involving any appropriate form of redundancy and any required number of power supply modules arranged to supply any required number of fieldbus channels.

Thus, any appropriate configuration or achieving a regulated channel within each module can be provided along with any appropriate means for achieving the required current share and load balancing across the three modules and as tracked/followed by the additional (secondary) channels.

The invention claimed is:
1. A power supply comprising:
 a plurality of power supply modules each arranged to output power on a plurality of channels;
 a current share controller arranged to control sharing of an output current requirement across first channels of the plurality of channels of the plurality of power supply modules; and
 at least a second channel of the plurality of channels in each power supply module of the plurality of power supply modules being arranged to track an output voltage of the respective first channel of the plurality of channels in each respective power supply module of the plurality of power supply modules under all loading conditions, wherein a common transformer is employed for the plurality of channels within each power supply module of the plurality of power supply modules.

2. The power supply as claimed in claim 1 and including redundant power supply functionality.

3. The power supply as claimed in claim 2 and comprising an N+1 redundancy architecture.

4. The power supply as claimed in claim 1, wherein the first channels of the plurality of channels comprise a regulated channel.

5. The power supply as claimed in claim 4, wherein each of the second channel, and any subsequent channels of the plurality of channels comprises a non-regulated channel.

6. The power supply as claimed in claim 1, wherein the current share controller is configured to provide a balanced load-sharing between the plurality of power supply modules.

7. The power supply as claimed in claim 1, wherein the current share controller comprises a control feedback means.

8. The power supply as claimed in claim 1, wherein each power supply module of the plurality of power supply modules comprises a current share controller and a control feedback arrangement.

9. The power supply as claimed in claim 8, wherein each power supply module of the plurality of power supply modules employs an internal adjust on a regulated channel of the plurality of channels by way of a single external share line.

10. The power supply as claimed in claim 1, wherein each power supply module of the plurality of power supply modules employs a single power supply unit.

11. The power supply as claimed in claim 1, wherein each power supply module of the plurality of power supply modules comprises a switch mode power supply controller and the common transformer.

* * * * *